United States Patent
Balko

(10) Patent No.: US 10,915,270 B2
(45) Date of Patent: Feb. 9, 2021

(54) RANDOM FILE I/O AND CHUNKED DATA UPLOAD

(71) Applicant: Clipchamp IP Pty Ltd, Fortitude Valley (AU)

(72) Inventor: Soeren Balko, Indooroopilly (AU)

(73) Assignee: Clipchamp IP Pty Ltd, Fortitude Valley (AU)

( * ) Notice: Subject to any disclaimer, the term of this patent is extended or adjusted under 35 U.S.C. 154(b) by 293 days.

(21) Appl. No.: 16/043,570

(22) Filed: Jul. 24, 2018

(65) Prior Publication Data

US 2019/0026047 A1    Jan. 24, 2019

Related U.S. Application Data

(60) Provisional application No. 62/536,019, filed on Jul. 24, 2017.

(51) Int. Cl.
*G06F 3/06* (2006.01)

(52) U.S. Cl.
CPC .......... *G06F 3/0659* (2013.01); *G06F 3/0604* (2013.01); *G06F 3/0643* (2013.01); *G06F 3/0673* (2013.01)

(58) Field of Classification Search
CPC .... G06F 3/0604; G06F 3/0643; G06F 3/0659; G06F 3/0673
USPC .......................................................... 711/154
See application file for complete search history.

(56) References Cited

U.S. PATENT DOCUMENTS

| | | | | |
|---|---|---|---|---|
| 5,347,632 | A  * | 9/1994 | Filepp | C08L 67/025 707/E17.032 |
| 7,099,997 | B2 * | 8/2006 | Balazich | G06F 13/387 711/118 |
| 7,249,229 | B2 * | 7/2007 | Ogasawara | G06F 3/0613 709/206 |
| 2005/0007838 | A1 * | 1/2005 | Makela | G11C 15/00 365/199 |
| 2013/0232215 | A1 * | 9/2013 | Gupta | G06F 3/067 709/213 |
| 2015/0277802 | A1 * | 10/2015 | Oikarinen | G06F 3/0604 711/114 |
| 2016/0306552 | A1 * | 10/2016 | Liu | G06F 3/0679 |
| 2018/0275886 | A1 * | 9/2018 | Zhang | G06F 3/0685 |

FOREIGN PATENT DOCUMENTS

EP    1891642 A2 *    2/2008    .......... G11C 7/1045

* cited by examiner

*Primary Examiner* — Reginald G Bragdon
*Assistant Examiner* — Aaron D Ho
(74) *Attorney, Agent, or Firm* — Neugeboren O'Dowd PC

(57) ABSTRACT

A method for writing a plurality of byte arrays to a file arranged in one or more existing data pages, comprising the steps of: identifying a data page corresponding to a first offset; reserving an array of reserved bytes at the first offset, identifying a data page corresponding to the second offset; writing the second byte array at the second offset; writing the first byte array in the array of reserved bytes; determining whether the data pages corresponding to the first offset is ready for uploading to a remote memory source; and uploading the data pages corresponding to the first offset to the remote memory source.

18 Claims, 2 Drawing Sheets

RANDOM FILE I/O AND CHUNKED DATA UPLOAD

PRIORITY

This application claims priority to U.S. Provisional Application Ser. No. 62/536,019, filed Jul. 24, 2017, entitled "Random File I/O and Chunked Data Upload Capabilities on Main Memory-constrained Devices," which is incorporated by reference herein in its entirety.

TECHNICAL FIELD

The present invention relates to the management of data within a file stored in random access memory.

BACKGROUND ART

For some applications which create, manage and utilize large files, there is a need to utilize random-access file input and output and to utilize file upload capabilities to upload the file to an external or remote memory source. This may be particularly crucial for software applications running on computing devices with constrained main-memory capacity or with limited persistent storage capacity. Such devices include mobile devices like phones or tablet computers, wearable devices, sensor devices including cameras with attached computing capabilities, embedded computing devices, virtualized devices, sandboxed runtime environments, and other environments that produce large files by performing random-access writes to a file and progressively uploading the file to a remote memory source or data sink, such as another computing device or a server computer. Further, for some applications, there is a need to write byte arrays to random byte offsets within the file and to have the capability to write byte arrays to a file out of byte sequence order.

It will be clearly understood that, if a prior art publication is referred to herein, this reference does not constitute an admission that the publication forms part of the common general knowledge in the art in any country.

SUMMARY OF INVENTION

The invention generally relates to a random-access data upload which includes a computing device, which is the runtime environment for a legacy application that produces large file through its input/output module. The computing device further hosts an upload file system, which contains a file system proxy, a buffered stream writer, a chunked uploader, and an in-memory collection of file streams that are currently opened, each having a page queue.

The computing device is complemented by another, storage-attached device, which has a remote upload interface to receive requests to store data chunks and a file storage to concatenate those data chunks into continuous files.

A preferred aim of an embodiment of the invention is to provide a random file i/o and chunked data upload capabilities on main memory-constrained devices for running software applications on computing devices with constrained main-memory capacity and without a persistent storage capability or where persistent storage capacity is limited (such as mobile devices like phones or tablet computers, wearable devices, sensor devices including cameras with attached computing capabilities, embedded computing devices and others, virtualized devices and sandboxed runtime environments and others) to produce large files by performing random-access writes to that file and progressively uploading the file to another computing device (such as a server computer) using a chunked upload protocol where the file is uploaded in pages, being same-sized blocks of data.

Another preferred aim of an embodiment of the invention is to provide a random file i/o and chunked data upload capabilities on main memory-constrained devices that minimizes the main memory consumption which may result from buffering the data prior to uploading it. Furthermore, the main memory consumption may be controllable by configuring a page size, which is an integer number greater than 0 representing the number of bytes within a page.

Another preferred aim of an embodiment of the invention is to provide a random-access file management and chunked data upload capabilities for applications running on main-memory constrained devices, by progressively uploading a file to another communicatively coupled device (such as a server computer, a storage controller, another client computing device) by using a chunked upload protocol, where the file data is split into pages (which may be equal sized data chunks). The pages may be individually uploaded (transmitted) to the other communicatively coupled device.

Another preferred aim of an embodiment of the invention is to provide a random file i/o and chunked data upload capabilities on main memory-constrained devices that plugs into a legacy application such as for example a video editing or transcoding software by instrumenting (augmenting) the code to write an output file with statements that marks a range of bytes at the current byte offset, which will later be updated with other values by seeking back (in the file) to the offset of that range of that byte range and updating the values.

Another preferred aim of an embodiment of the invention is to provide a random file i/o and chunked data upload capabilities on main memory-constrained devices that allows legacy applications to produce files of unlimited size, which can be created in sequential writes (where data is always appended to the back of the file) or by random-access writes (where data can be appended at the back of the file or overwritten somewhere else within the file).

With the foregoing in view, the present invention in one form, resides broadly in a method for writing a plurality of byte arrays to a file, the file comprising existing data arranged in one or more existing data pages, the plurality of byte arrays comprising a first byte array and a second byte array, the first byte array having a first size, and associated with a first offset, the second byte array associated with a second offset, the method comprising the steps of: identifying at least one of the one or more existing data pages corresponding to the first offset; reserving an array of reserved bytes at the first offset within the at least one of the one or more existing data pages corresponding to the first offset, the array of reserved bytes having a size equal to the first size; identifying at least one of the one or more existing data pages corresponding to the second offset; writing the second byte array at the second offset within the at least one of the one or more existing data pages corresponding to the second offset; writing the first byte array in the array of reserved bytes within the at least one of the one or more existing data pages corresponding to the first offset; determining whether the at least one of the one or more existing data pages corresponding to the first offset is ready for uploading to a remote memory source; and uploading the at least one of the one or more existing data pages corresponding to the first offset to the remote memory source.

The at least one of the one or more existing data pages corresponding to the first offset may be the same page as the at least one of the one or more existing data pages corresponding to the second offset. The at least one of the one or more existing data pages corresponding to the first offset may be a first data page, and the at least one of the one or more existing data pages corresponding to the second offset may be a second data page.

The one or more existing data pages may comprise one or more data pages stored in available main memory. The one or more existing data pages may comprise one or more data pages stored in the remote memory source. The one or more existing data pages may include one or more data pages stored in the available main memory, and one or more data pages stored in the remote memory source.

The size of the file may exceed a size of the available main memory. The array of reserved bytes within the at least one of the one or more existing data pages corresponding to the first offset may not contain any of the existing data of the file. The array of reserved bytes within the at least one of the one or more existing data pages corresponding to the first offset may contain a portion of the existing data of the file. The portion of the existing data of the file may be overwritten by the first byte array.

The at least one of the one or more existing data pages corresponding to the first offset may be stored within the remote memory source. The at least one of the one or more existing data pages corresponding to the first offset may be retrieved from the remote memory source prior to performing the steps of reserving an array of reserved bytes and writing the first byte array at the first offset. The at least one of the one or more existing data pages corresponding to the second offset may be stored within the remote memory source. The at least one of the one or more existing data pages corresponding to the second offset may be retrieved from the remote memory source prior to performing the step of writing the second byte array at the second offset.

A write byte counter may be maintained for at least one of the one or more existing data pages corresponding to the first offset. The step of determining whether the at least one of the one or more existing data pages corresponding to the first offset is ready for uploading may include determining whether the write byte counter is equal to the size of the at least one of the one or more existing data pages corresponding to the first offset.

The at least one of the one or more existing data pages corresponding to the first offset may be determined to be ready for uploading to the remote memory source when the write byte counter is not equal to the size of the at least one of the one or more existing data pages corresponding to the first offset. The at least one of the one or more existing data pages corresponding to the first offset may be determined to be ready for uploading to the remote memory source when the file is closed.

The step of reserving a byte array may include seeking to the first offset. The step of write a byte array may include seeking to the first offset.

According to another aspect of the invention there is provided a system for writing a plurality of byte arrays to a file, the file comprising existing data arranged in one or more existing data pages, the plurality of byte arrays comprising a first byte array and a second byte array, the first byte array having a first size, and associated with a first offset, the second byte array associated with a second offset, the system comprising a file management module, configured to: identify at least one of the one or more existing data pages corresponding to the first offset; reserve an array of reserved bytes at the first offset within the at least one of the one or more existing data pages corresponding to the first offset, the array of reserved bytes having a size equal to the first size; identify at least one of the one or more existing data pages corresponding to the second offset; write the second byte array at the second offset within the at least one of the one or more existing data pages corresponding to the second offset; write the first byte array in the array of reserved bytes within the at least one of the one or more existing data pages corresponding to the first offset; determine whether the at least one of the one or more existing data pages corresponding to the first offset is ready for uploading to a remote memory source; and interface with an uploading module to upload the at least one of the one or more existing data pages corresponding to the first offset to the remote memory source.

Other objects and advantages of the present invention will become obvious to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of this application.

In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

Accordingly, it is to be understood that any of the features described herein can be combined in any combination with any one or more of the other features described herein within the scope of the invention.

There has thus been outlined, rather broadly, some of the features of the invention in order that the detailed description thereof may be better understood, and in order that the present contribution to the art may be better appreciated. There are additional features of the invention that will be described hereinafter.

BRIEF DESCRIPTION OF DRAWINGS

Preferred features, embodiments and variations of the invention may be discerned from the following detailed description which provides sufficient information for those skilled in the art to perform the invention. The detailed description is not to be regarded as limiting the scope of the preceding Summary of the Invention in any way. The detailed description will make reference to a number of drawings as follows.

DESCRIPTION OF EMBODIMENTS

Figure 1:
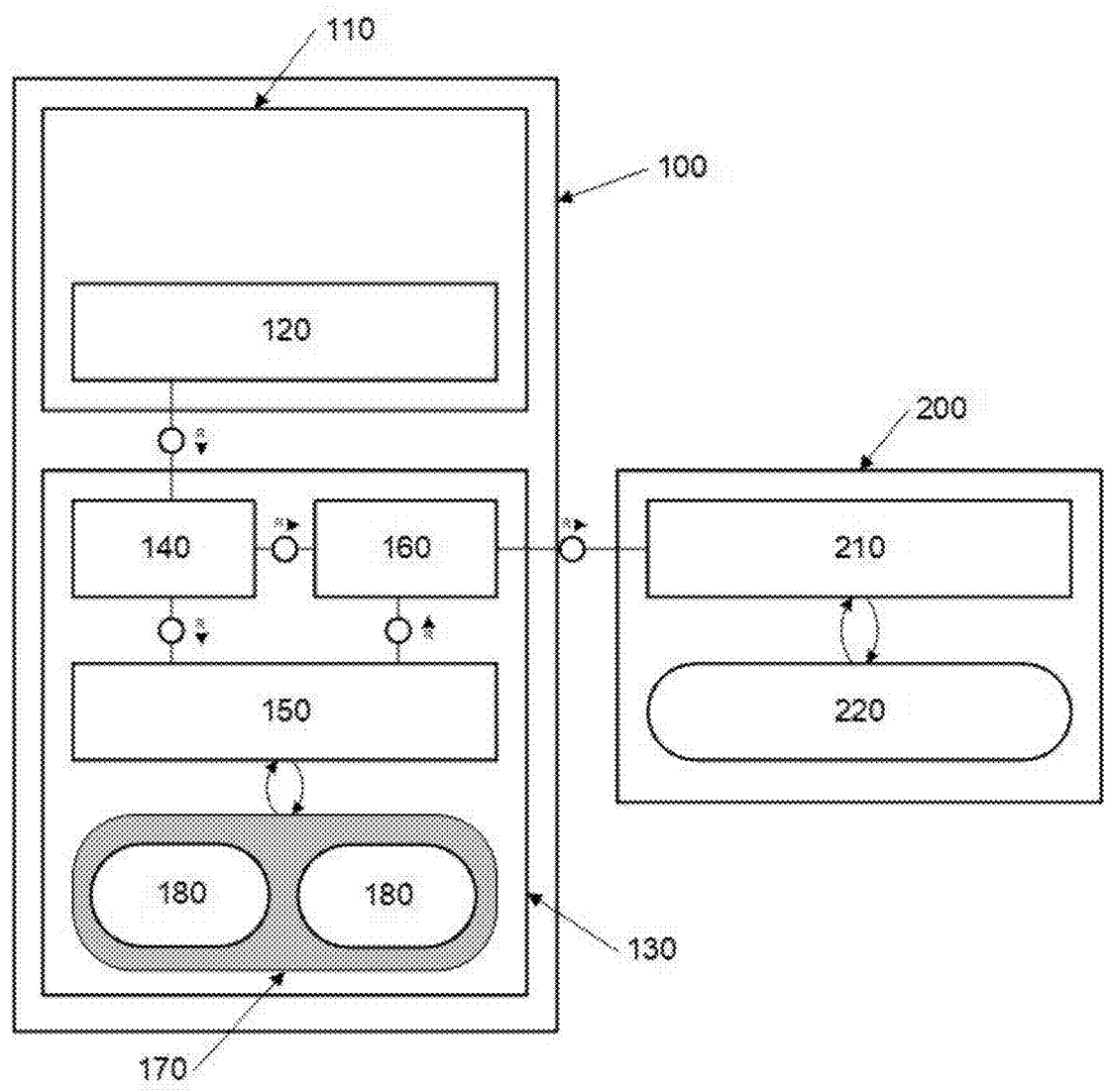
FIG. 1 is a block diagram of the principal components of an embodiment of the invention.

Turning now descriptively to the figures, in which similar reference characters denote similar elements throughout the several views.

FIG. 1 is a block diagram depicting the principal components of an embodiment of the invention and their interactions, being a computing device 100 that runs at least one application 110 and an upload file system module 130 and a storage-attached device 200 that hosts a file storage 220, whose file storage capabilities are exposed by a remove upload interface 210 that is communicatively coupled to the computing device 100.

A computing device 100, which is the runtime environment for an application 110 that produces large file through its input/output module 120. The computing device further hosts an upload file system 130, which contains a file system proxy 140, a buffered stream writer 150, a chunked uploader 160, an in-memory collection of one or more file streams 170 that are currently opened for editing, each of the file streams 170 having a page queue 180.

The computing device 100 is complemented by another, storage-attached device 200, which is communicatively coupled to the computing device 100. The storage-attached device 200 is a remote memory source and has a remote upload interface 210 to receive requests to store data chunks and a file storage 220 to (logically or physically) concatenate those data chunks into continuous files.

The input/output module 120 is a component of application 100, which provides a layer between the input/output functionality of the computing device, provided by its operating system or runtime environment, and the application code of application 100 which is concerned with producing data that is ready to be stored in a file. On top of standard Application Programming Interfaces (APIs) to open a file for writing, seeking to a given byte offset within the file, writing arbitrary sized data chunks into the file, etc., the input/output module 120 provides the following two functions: (1) reserve a number of bytes, at a byte offset within the file, that may later be written to after seeking back to that byte offset; and (2) to seek back to a byte offset (where a number of bytes were previously reserved) and write a given data chunk into the file at that byte offset.

Application 110 is a software application that produces output files, where writing data to the output file may happen in random file accesses. That is, data may be written in a non-continuous manner, and where subsequent write requests may overwrite or fill in data at previously written data chunks at byte offsets within the file that are located before the current end of the file.

The input/output module 120 performs low-level file operations on behalf of the application 110, such as seeking to a given byte offset and writing a data chunk at a byte offset within the file. However, the input/output module 120 does not directly write data to a file, but consolidates and communicates these file writing operations to the file system proxy 140 of the upload file system 130. The input/output module also performs extra operations on behalf of the application 110. These extra operations are reserve operations that mark a range of bytes at a specified byte offset in the file. The range of bytes that are reserved are subject to be later overwritten, if the reserved bytes currently contain file data, or filled in, if the reserved bytes do not currently contain file data. The overwriting or filling-in of the reserved bytes can occur after other data chunks have been appended to the end of the file. That is, these later overwrite/filling-in operations require a preceding seek operation where the byte offset for the overwrite/filling-in operation is set back to the byte offset in the file where the reserve operation was previously called.

By communicating the aforementioned reserve operations to the file system proxy 140, the input/output module 120 enables the upload file system 130 to implement a bookkeeping algorithm that keeps track of future write operations that are to be expected within the file.

In one embodiment of the invention, the input/output module 120 is a software component that is separated from the application 110, which may be a closed-source software or hardware device. In another embodiment of the invention, the application 110 is an open-source software package that allows the changing of the code of the application 110 itself.

In an embodiment of the invention, the application 110 is automatically configured to perform the reserve operations by an algorithm which identifies the code paths from an overwrite/fill-in sequence of a seek and one or many write operations back to the preceding write operation where that byte sequence was initially written or the seek operation where the byte sequence was initially skipped (ie., omitted from having any data written into it).

The algorithm to automatically add the reserve operation determines the byte size of the to-be-reserved byte sequence by determining the number of bytes that are later filled-in or overwritten. The byte offset that marks the start of the byte sequence to be later overwritten/filled in and the length of the byte sequence are the two parameters of the reserve operation that is communicated to the file system proxy 140.

The file system proxy 140 is a component of the upload file system 130 that acts as a file system replacement for application 110, receiving file operation commands from the input/output module 120 of application 110. The file system proxy 140 further maintains a set of files that are opened for writing by application 110. When receiving the command to create a file from an input/output module 120, the file system proxy 140 interacts with the buffered stream writer 150 to create a page queue 180 for the new file. The file system proxy 1140 also interacts with the chunked uploader 160 to initiate an upload process with a remote storage-attached device 200, to enable uploading of the file data to the remote memory source within the storage-attached device.

The upload file system 130 is the core part of the invention that acts as a buffer between application 110 and the remote storage-attached device 200. Specifically, the upload file system 130 mimics the features and capabilities of a regular file system to the application 110 by means of its file system proxy 140. Specifically, the file system proxy 140 offers operations to create files, close files, and write data into files at random byte offsets.

The buffered stream writer 150 is a part of the upload file system 130 that maintains a file stream 170 and associated page queue 180 for each file that is currently opened for writing to. The file stream 170 contains metadata about the file, such as the current file size in bytes, the current byte offset for writing, the set page size of the file (which is a number greater than zero indicating the size of the pages of the file, and typically set to the multiple of few megabytes), and other metadata that is required by the chunked uploader 160 to maintain a file upload session with the remote upload interface 210 of the storage-attached device 200.

The file's page queue 180 is an ordered list of existing data pages, each being an array of bytes having a size of no more than the set page size. Each page is associated with a written bytes counter, which is a number that is zero when the page is created and grows with every write operation.

A reserve operation decreases the written bytes counter for a page, by the number of bytes to be reserved, if the array of reserved bytes is logically located on the page. Once the written bytes counter is equal to the page size of the file, or the file is explicitly closed by the application 110, the buffered stream writer 150 may "flush" that page, i.e., hand it over to the chunked uploader 160 to be uploaded to the storage-attached device 200.

In an embodiment of the invention, the upload file system 130 caches pages that are part of a file's page queue 180 until all pages that are part of the queue before the ready-to-be flushed page are all ready to be flushed too. This functionality of the upload file system 130 can be employed to comply with a remote storage-attached device 200 whose remote upload interface 210 requires that a file's pages be uploaded "in order".

In an embodiment of the invention, a ready-to-be flushed page within the page queue 180 will be uploaded to the storage-attached device 200 by means of the chunked uploader 160 irrespectively of having other, not-yet flushed pages residing in front of this page in the page queue 180. This functionality of the upload file system 130 can be employed if the remote storage-attached device 200 implements an upload protocol through its remote upload interface 210 that supports uploading a file's pages out of sequential order.

In an embodiment of the invention, the buffered stream writer 150 directs the chunked uploader 160 to upload a page of a file even if the page may include an array of reserved bytes which may be later overwritten or filled-in by the application 110. This functionality of the upload file system 130 can be employed if the remote storage-attached device 200 provides an upload protocol that permits later replacing or "patching" (partially overwriting) of previously uploaded pages.

In an embodiment of the invention, the chunked uploader 160 receives a preferred or mandatory page size from the storage-attached device containing the remote memory source. The chunked uploader 160 subsequently uses this page size in the buffered stream writer 150 to configure the page queues 180.

In an embodiment of the invention, the chunked uploader 160 configures the application 110 through the file system proxy 140 and the input/output module 120 to produce files such that fewer reserve operations are required or the where the pair out of a reserve operation and the corresponding seek and write operations (to fill in data or overwrite data) is only a low number of bytes apart concerning the current byte offset at which those operations are performed. For instance, for a application 110 that is a video encoding software, producing Motion Picture Experts Group (MPEG) MP4 video files, the upload file system 130 may configure the application to produce fragmented MP4 files.

The buffered stream writer 150 is a component of the upload file system 130 that manages a set of page queues 180 (one for each file that is currently opened for writing) with associated metadata, collectively forming file streams 170. The file streams 170 are held in main memory of the computing device 100 or in a suitable persistent storage that is locally available on the computing device 100. The buffered stream writer 150 receives commands to create files, close files, and perform random-access write operations on opened files from the file system proxy 140. The buffered stream writer 150 applies these operations on the corresponding page queues 180 and further interacts with the chunked uploader 160 when one or many pages of a file are due to be flushed and sent to the remote storage-attached device 200.

The chunked uploader 160 is a component of the upload file system 130 that interacts with the remote upload interface 210 of an (external) storage attached device 200. That is, the chunked upload 160 implements a chunked upload protocol as defined by the storage-attached device 200. The chunked uploader 160 receives, from the buffered stream writer 150, data pages that are ready to be uploaded to the remote memory source via the storage-attached device 200.

The storage-attached device 200 is a service or device suitable to store files. The storage-attached device 200 defines a chunked upload protocol, where its remote upload interface 210 receives fragments of a file from the chunked uploader 160 of the upload file system 130 in separate requests, each carrying a separate fragment (or data page) of the file. The storage-attached device 200 contains a file storage 220 facility suitable for persistently storing files. The remote upload interface 210 provides the entry point to the storage-attached device 200, receiving requests to upload file pages from the chunked uploader 160. The remote upload interface 210 may offer an Application Programming Interface (API) that is accessible over a network such as the Internet using protocols such as Hypertext Transfer Protocol (HTTP), Microsoft® Server Message Block (SMB), File Transfer Protocol (FTP) or any other network protocol suitable to upload files in chunks.

In an embodiment of the invention, the storage-attached device 200 is a Cloud computing file storage such as Amazon Web Services® (AWS), Simple Storage Service (S3), Dropbox® or any other software as a service (SaaS) provider offering file storage capabilities and exposing a networked API.

In an embodiment of the invention, the storage-attached device 200 is a hardware device such as a Network Attached Storage (NAS) device, or an external hard drive, that is communicatively coupled to the computing device 100. In another embodiment of the invention, the storage-attached device 200 may be another client computing device that is suitable to store files and is communicatively coupled to the computing device 100 using protocols such as Web Real-Time Communication (WEBRTC), etc.

The computing device 100 contains any number of applications 110 and at least one upload file system 130. Each application 110 has one input/output module 120. The upload file system 130 encompasses a file system proxy 140, a buffered stream writer 150, and a chunked uploader 160.

The storage-attached device 200 encompasses a remote upload interface 210 and a file storage 220.

According to an embodiment of the invention, the computing device 100 is a mobile device such as an Apple iPhone® or a Google Android®-based mobile phone running a web browser and the storage-attached device 200 is a cloud file storage service such as AWS S3®. The computing device 100 may be limited with regards to main memory capacity and the ability to store files on the device, effectively rendering it impossible to store large files on the computing device 100.

Available main memory is memory accessible by the application 110 via the input/output module 120, which is available for use by the input/output module 120 for the purposes of writing or modifying a file or set of files. The size of available main memory may be a static size or a size that is variable or configurable. The size of available main memory may be influenced by a range of factors, internal or external to the computing device 100. The size of main memory that is available to be used to manage a file may be dependent upon the number and types of files being simultaneously managed by an embodiment of the invention. Furthermore, the size of main memory that is available to be used to manage a file may be dependent upon the number and type of applications that currently have access to the main memory or are anticipated to do so in the future, and the number and type of files to be managed by the applications.

An embodiment of the invention may reserve, or allocate a portion of the existing memory resources, within the computing device 100, that is presently unutilized, thus reducing the size of main memory available to be used to manage a file. Alternatively, an embodiment of the invention may allocate, or be allocated, a portion (or set of portions) of main memory to be available to be used to manage a file.

Accordingly, an embodiment of the invention can be configured to use an amount of available main memory which is smaller than the total size of the file, to manage write and reserve operations relating to that file.

In an embodiment of the invention the storage-attached device 200 supports receiving pages of a file "out of order", requiring only a small number of pages to be held on the computing device 100. The application 110 may be a video encoding software receiving video files from the computing devices' 100 camera or internal storage and re-encoding these video files in another video format such as MP4. In an embodiment of the invention, the input video files do not require a full transcoding (decoding and re-encoding of the contained audio and video data) but are compressed using a re-quantization (also known as "transrating" or "bitrate shaping") technique, where the audio or video streams are further compressed without decoding the audio or video streams first. In an embodiment of the invention, the audio and video streams that are contained in the input video file are re-packaged into an output video file that has a different video container format, such as MP4.

Figure 2:
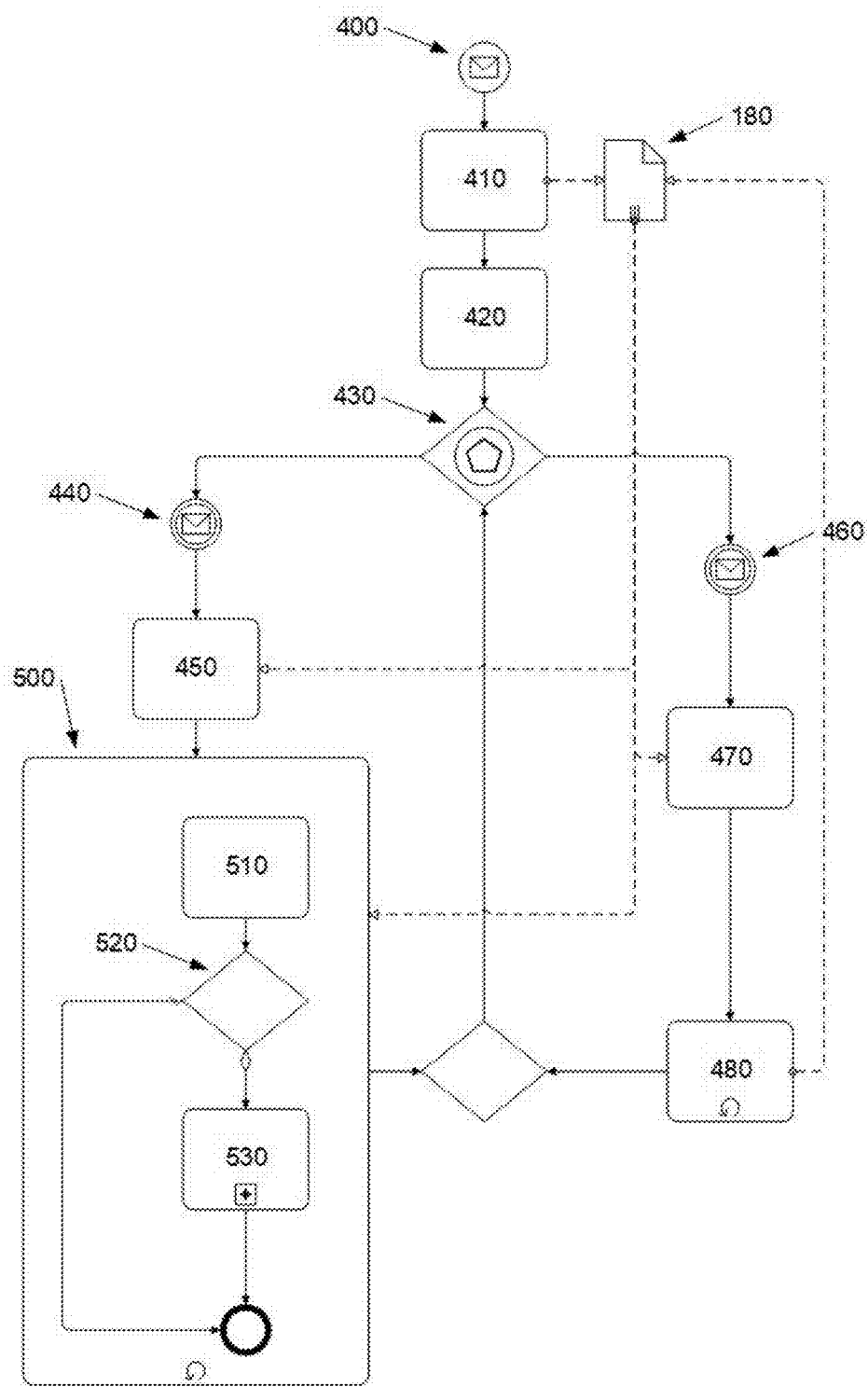
FIG. 2 is a flowchart illustrating a sub-operation of the embodiment of the invention shown in FIG. 1.

The flowchart 400 in FIG. 2 is depicted in Object Management Group's (OMG®) Business Process Modeling Notation (BPMN), and illustrates the principal sequence of steps performed by the upload file system 130 to create a file, and process reserve and write operations to a file.

In step 400, the file system proxy 140 of the upload file system 130 receives the request from the input/output module 120 of an application 110 to create a new file.

In step 410, the buffered stream writer 150 creates a file stream object (which encompasses data such as the current file size, the current byte offset, the page size and other data that is needed for the chunked uploader 160 to progressively upload file pages to the storage-attached device 200) and an (initially empty) page queue for the newly created file.

In step 420, the chunked uploader 160 interfaces with the remote upload interface 210 of the storage-attached device 200 to establish an upload session for this file.

In step 430, the file system proxy 140 waits to receive subsequent file operations from the input/output module 120 of the application 110.

In step 440, the file system proxy 140 receives a random-access write operation from the input/output module 120. The random-access write operation comprises information necessary to perform a write of a byte array to a file at an offset. The information includes the byte array (or a handle thereto), the size of the byte array and the offset (which is an offset with the file at which the byte array is to be written).

In step 450, the buffered stream writer 150 analyzes the random-access write operation to determine the pages within the page queue 180 that are affected by this write operation. In order to do so, the buffered stream writer 150 uses the byte offset of the write operation, the number of bytes to be written, and the page size to determine (i) the pages of the file (corresponding to same-sized segments of the file) that are affected by the write operation and (ii) for each affected page, the offset on the page and the exact array of bytes to be written to the page.

Step 500 is a sub-process that is executed for each affected page that was determined in step 450, using the page-specific offset and byte array as input. The instances of the sub-process corresponding to step 500, each processing a different affected page can run sequentially or in parallel. After each instance of sub-process 500 is complete, the process continues at step 430.

In step 510, the page-specific byte array that was determined in step 450 is written to the page at the page-specific offset, increasing the number of bytes by the length of the array of bytes that is written onto the current page.

In step 520, it tested if the number of bytes property of the current page is equal to the page size. If the number of bytes is equal to the page size, the process continues at step 530. Otherwise (if the number of bytes is less than the page size), sub-process 500 ends.

Step 530 is a sub-process that encapsulates the steps taken to conditionally flush one or many pages from the page queue 180. Flushing a page from the page queue 180 passes that page to the chunked uploader 160, which, in turn, uploads the page to the storage-attached device 200. Subsequently, the page is removed from main memory of the computing device 100 and is also removed from the page queue 180. Different strategies exist to decide which pages of the page queue 180 are flushed when sub-process 530 is invoked.

In one embodiment of the invention (where the storage-attached device 200 expects pages to be uploaded in the order with which they appear in the file) step 530 starts at the first page in the queue, flushes that page if it is ready to be flushed (using the test from step 520). If the current page was flushed, the algorithm progresses to the next page in page queue 180, otherwise sub-process 530 ends. In another embodiment of the invention (where the storage-attached device 200 accepts pages to be uploaded in any order), any page in the page queue 180 that is ready to be flushed (see step 520) will be flushed, regardless of its position in the page queue. When step 530 is complete, sub-process 500 will be completed for the current page.

In step 460, the file system proxy 140 receives a reserve operation from the input/output module 120.

In step 470, the buffered stream writer 150 analyzes the reserve operation to determine the pages within the page queue 180 that are affected by this reserve operation. In order to do so, the buffered stream writer 150 uses the byte offset of the reserve operation, the number of bytes to be reserved, and the page size to determine (i) the pages of the file (corresponding to same-sized segments of the file) that are affected by the reserve operation and (ii) for each affected page, the exact number of bytes to be reserved for that page.

Step 480 is a loop or parallel execution that runs for each of the pages identified in step 470. Each instance (parallel instance or loop cycle) of step 480 decrements the current page's number of available bytes by the number of bytes that are to be reserved for that page. After each instance of step 480 is complete, the process continues at step 430.

The upload file system 130 can receive multiple write operations and multiple reserve operations in sequence from the input/output module 120, which is interfaced to the application 110.

Via the input/output module 120, the application may reserve an array of reserved bytes within the file, at a first offset, to later write a first byte array, having a first size. To execute this operation, the input/output module 120 would provide a reserve operation to the file system proxy 140. The upload file system 130 would perform steps 470 and 480 to reserve a section of bytes, equal to the first size, at the first offset for the first byte array.

After completing step 480 and continuing the process at step 430, the upload file system 130 may proceed to steps 450 and 510 if the file system proxy 140 receives a second write operation from the input/output module 120. Thus, a second byte array can be written to the file at second offset. Subsequent write operations at various file offsets may also be performed by the upload file system 130 in response to instructions received from the input/output module 120. For each write operation, the steps of 450, 510 and 530 may be performed, as described above.

The upload file system 130 may also perform further reserve operations if the file system proxy 140 receives a second (or further) reserve operation from the input/output module 120.

The upload file system may subsequently receive a write operation instruction to write the first byte array in the array of reserved bytes which have been previously reserved at the first offset. To perform the write operation, the upload file system would perform the steps of 450, 510 and optionally 530, as described above.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention in which all terms are meant in their broadest, reasonable sense unless otherwise indicated. Any headings utilized within the description are for convenience only and have no legal or limiting effect.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention in which all terms are meant in their broadest, reasonable sense unless otherwise indicated. Any headings utilized within the description are for convenience only and have no legal or limiting effect.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A method for writing a plurality of byte arrays to a file, the file comprising existing data arranged in one or more existing data pages, the plurality of byte arrays comprising a first byte array and a second byte array, the first byte array having a first size, and associated with a first offset, the second byte array associated with a second offset, the method comprising the steps of:
    identifying at least one of the one or more existing data pages corresponding to the first offset;
    reserving an array of reserved bytes at the first offset within the at least one of the one or more existing data pages corresponding to the first offset, the array of reserved bytes having a size equal to the first size;
    identifying at least one of the one or more existing data pages corresponding to the second offset;
    writing the second byte array at the second offset within the at least one of the one or more existing data pages corresponding to the second offset;
    writing the first byte array in the array of reserved bytes within the at least one of the one or more existing data pages corresponding to the first offset;
    determining whether the at least one of the one or more existing data pages corresponding to the first offset is ready for uploading to a remote memory source;
    uploading the at least one of the one or more existing data pages corresponding to the first offset to the remote memory source; and
    wherein the at least one of the one or more existing data pages corresponding to the first offset is determined to be ready for uploading to the remote memory source when a write byte counter is not equal to the size of the at least one of the one or more existing data pages corresponding to the first offset.

2. The method of claim 1, wherein the at least one of the one or more existing data pages corresponding to the first offset is the same page as the at least one of the one or more existing data pages corresponding to the second offset.

3. The method of claim 1, wherein the at least one of the one or more existing data pages corresponding to the first offset is a first data page, and the at least one of the one or more existing data pages corresponding to the second offset is a second data page.

4. The method of claim 1, wherein the one or more existing data pages comprise one or more data pages stored in available main memory.

5. The method of claim 1 wherein the one or more existing data pages comprise one or more data pages stored in the remote memory source.

6. The method of claim 1 wherein the one or more existing data pages include one or more data pages stored in the available main memory, and one or more data pages stored in the remote memory source.

7. The method of claim 1, wherein a size of the file exceeds a size of available main memory.

8. The method of claim 1, wherein the array of reserved bytes within the at least one of the one or more existing data pages corresponding to the first offset does not contain any of the existing data of the file.

9. The method of claim 1, wherein the array of reserved bytes within the at least one of the one or more existing data pages corresponding to the first offset contains a portion of the existing data of the file.

10. The method of claim 9 wherein the portion of the existing data of the file is overwritten by the first byte array.

11. The method of claim 1, wherein the at least one of the one or more existing data pages corresponding to the first offset is stored within the remote memory source.

12. The method of claim 1, wherein the at least one of the one or more existing data pages corresponding to the first offset is retrieved from the remote memory source prior to performing the steps of reserving an array of reserved bytes and writing the first byte array at the first offset.

13. The method of claim 1, wherein the at least one of the one or more existing data pages corresponding to the second offset is stored within the remote memory source.

14. The method of claim 1, wherein the at least one of the one or more existing data pages corresponding to the second offset is retrieved from the remote memory source prior to performing the step of writing the second byte array at the second offset.

15. The method of claim 1, wherein a write byte counter is maintained for at least one of the one or more existing data pages corresponding to the first offset.

16. The method of claim 15, wherein the step of determining whether the at least one of the one or more existing data pages corresponding to the first offset is ready for uploading includes determining whether the write byte counter is equal to the size of the at least one of the one or more existing data pages corresponding to the first offset.

17. The method of claim 1, wherein the at least one of the one or more existing data pages corresponding to the first offset is determined to be ready for uploading to the remote memory source when the file is closed.

18. The method of claim 1, wherein the step of reserving a byte array includes seeking to the first offset.

* * * * *